United States Patent
Takagi et al.

(10) Patent No.: US 10,094,449 B2
(45) Date of Patent: Oct. 9, 2018

(54) CHAIN TENSIONER

(71) Applicant: TSUBAKIMOTO CHAIN CO., Osaka-shi, Osaka (JP)

(72) Inventors: Yudai Takagi, Osaka (JP); Masatoshi Sonoda, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 198 days.

(21) Appl. No.: 15/095,529

(22) Filed: Apr. 11, 2016

(65) Prior Publication Data

US 2016/0305512 A1    Oct. 20, 2016

(30) Foreign Application Priority Data

Apr. 15, 2015    (JP) .................................. 2015-083086

(51) Int. Cl.
*F16H 7/22*    (2006.01)
*F16H 7/08*    (2006.01)

(52) U.S. Cl.
CPC ............. *F16H 7/08* (2013.01); *F16H 7/0836* (2013.01); *F16H 2007/0814* (2013.01)

(58) Field of Classification Search
CPC ..... F16H 2007/0806; F16H 2007/0859; F16H 2007/0812; F16H 7/0848; F16H 2007/0891
USPC ....................................................... 474/110
See application file for complete search history.

(56) References Cited

U.S. PATENT DOCUMENTS

| | | | | |
|---|---|---|---|---|
| 4,190,025 A | * | 2/1980 | Wahl ..................... | F16H 7/1236 123/195 A |
| 4,940,447 A | * | 7/1990 | Kawashima ............ | F16F 13/00 474/110 |
| 4,985,009 A | * | 1/1991 | Schmidt .................... | F16F 9/50 474/110 |
| 5,116,284 A | * | 5/1992 | Cho ........................ | F16H 7/1236 474/110 |
| 5,277,664 A | * | 1/1994 | Mott ..................... | F16H 7/0848 474/110 |
| 5,607,368 A | * | 3/1997 | Hida ..................... | F16H 7/0848 474/110 |
| 5,637,047 A | * | 6/1997 | Schulze ................ | F16H 7/0848 474/110 |

(Continued)

FOREIGN PATENT DOCUMENTS

JP    11-22792 A    1/1999
JP    2000-145903 A    5/2000
(Continued)

*Primary Examiner* — Henry Y Liu
(74) *Attorney, Agent, or Firm* — Westerman, Hattori, Daniels & Adrian, LLP

(57) ABSTRACT

Provided is a chain tensioner that can always provide a suitable reaction force and damping force to various tension fluctuations of the chain, has a simple structure, is easy to produce, and also enables a reduction in the production cost. The chain tensioner 100 has a plunger 120 inserted in a plunger bore 111, and biasing means 140 for biasing the plunger in a protruding direction of the plunger. A plurality of biasing means 140 are accommodated so as to freely expand and contract inside a high pressure chamber 101 and arranged in series along the protruding direction of the plunger 120, with a separator plate 130 interposed therebetween. The separator plate 130 has one or more oil passages that adjust oil flow.

7 Claims, 8 Drawing Sheets

(56) References Cited

U.S. PATENT DOCUMENTS

| | | | | |
|---|---|---|---|---|
| 5,707,309 | A * | 1/1998 | Simpson | F16H 7/08 474/110 |
| 5,993,342 | A * | 11/1999 | Wigsten | F16H 7/08 474/110 |
| 6,117,033 | A * | 9/2000 | Simpson | F16H 7/0829 474/110 |
| 6,322,468 | B1 * | 11/2001 | Wing | F16H 7/08 474/109 |
| 6,383,103 | B1 * | 5/2002 | Fujimoto | F01L 1/02 474/109 |
| 6,471,611 | B1 * | 10/2002 | Hotta | F16H 7/1236 474/109 |
| 6,695,730 | B2 * | 2/2004 | Amano | F16H 7/08 474/101 |
| 8,007,384 | B2 * | 8/2011 | Kurematsu | F16H 7/0836 474/110 |
| 9,360,088 | B2 * | 6/2016 | Todd | F16H 7/08 |
| 9,683,637 | B2 * | 6/2017 | Todd | F16H 7/0836 |
| 9,879,764 | B2 * | 1/2018 | Todd | F16H 7/0848 |
| 2014/0187368 | A1 * | 7/2014 | Todd | F16H 7/08 474/110 |

FOREIGN PATENT DOCUMENTS

| | | | |
|---|---|---|---|
| JP | 2003-146554 A | 5/2003 | |
| JP | 2009-79619 A | 4/2009 | |
| JP | 2014-528047 A | 10/2014 | |
| WO | 2013/043373 A1 | 3/2013 | |

* cited by examiner

CHAIN TENSIONER

BACKGROUND OF THE INVENTION

1. Field of the Invention

The present invention relates to a chain tensioner that includes a tensioner body having a cylindrical plunger bore with an open end, a cylindrical plunger with a bottom, slidably inserted in the plunger bore, and biasing means that biases the plunger in a protruding direction of the plunger and is accommodated so as to freely expand and contract inside a high pressure chamber formed to extend over interiors of the plunger bore and the plunger, the chain tensioner maintaining appropriate tension of a chain.

2. Description of the Related Art

It has been common practice to use a chain tensioner for maintaining appropriate tension of a chain. For example, a timing system has been known, which has an endless timing chain such as a roller chain passing over respective sprockets of a crankshaft and a cam shaft inside an engine room, and which uses a chain tensioner to bias a pivoting chain guide having a guide shoe that slidably guides the timing chain.

In such a timing system, as shown in FIG. 13, an endless timing chain CH passes over a drive sprocket S1 attached to a crankshaft and a pair of driven sprockets S2 and S3 attached to cam shafts in an engine room, and a chain guide mechanism in which this timing chain CH is guided by a pivoting chain guide G1 and a fixed chain guide G2 is formed.

The fixed chain guide G2 is fixed in the engine room with two mounting shafts B1 and B2, while the pivoting chain guide G1 is attached such as to be pivotable around the mounting shaft B0 in the plane in which the timing chain CH runs in the engine room.

The chain tensioner 500 presses the pivoting chain guide G1 and thereby maintains the appropriate tension of the timing chain CH as well as reduces its vibration.

The known chain tensioner 500 used in such a chain guide mechanism includes, for example, as shown schematically in FIG. 14, a tensioner body 510 having a cylindrical plunger bore 511 with an open end, a cylindrical plunger 520 with a bottom inserted in the plunger bore 511 to slide against the cylindrical surface 513 of the plunger bore 511, and biasing means that biases the plunger 520 in a protruding direction of the plunger 520 from the plunger bore 511.

The biasing means are formed by a coil spring 540 accommodated inside a cylindrical recess 521 in the cylindrical plunger 520 with a bottom and compressed between the plunger and the bottom 512 of the plunger bore 511.

Oil is supplied from an oil supply hole 514 formed in the plunger bore 511, so that a high pressure chamber 501 formed to extend over interiors of the plunger bore 511 and the cylindrical recess 521 of the plunger 520 is filled with oil. A check valve 550 (schematically shown as a check ball) stops the oil from flowing out from the oil supply hole 514.

As the plunger 520 reciprocates, oil flows through the small gap between the plunger 520 and the plunger bore 511, and the flow resistance of the oil provides the damping effect of slowing down the reciprocal movement of the plunger 520.

In such a timing system, how much reaction force is required of the coil spring 540 depends on the engine. If it is assumed that there is much looseness in the chain when the engine is started, a high reaction force is required.

A high reaction force is needed also when the chain has elongated due to aging. This reaction force is too high for the chain that is not elongated yet.

The tensioner 500 is therefore designed to press the chain with a force more than necessary, which would deteriorate friction properties between the chain and its running surface, and reduce fuel economy of the engine.

Also, the chain is subjected to tension fluctuations that occur in accordance with the engine rpm and changes in the load. Since the cycle and amplitude of tension fluctuations depend on driving conditions and are not uniform, the plunger reciprocates in various cycles and at various speeds to absorb the tension fluctuations.

The reaction force of the coil spring 540 is determined by the position of the plunger 520 in accordance with its constant spring constant, and the damping effect it provides is determined by the speed of the plunger 520. Therefore, it is difficult to always provide a suitable reaction force and damping force in response to various tension fluctuations, and there were possibilities that, in specific driving conditions, resonance might occur, or the tension fluctuations might be amplified.

To mitigate these problems, one known chain tensioner includes a nose portion provided at the tip of the plunger via a second spring (50) in addition to the spring (first spring 40) inside a high pressure chamber (fluid chamber 22) so as to absorb sudden tension fluctuations with this second spring (see Japanese Patent Application Laid-open No. H11-22792, etc).

Another known chain tensioner includes a center member in a middle part of a spring inside a high pressure chamber (fluid chamber 80). The center member reciprocates with expansion and contraction of the spring and has a predetermined mass. The center member has the same resonance frequency as that of the plunger (piston 40) so as to dampen the movement of the plunger (piston 40) (see Japanese Patent Application Laid-open No. 2000-145903, etc).

SUMMARY OF THE INVENTION

However, with the technique described in Japanese Patent Application Laid-open No. H11-22792, the second spring and associated components are provided outside the high pressure chamber so that there is provided no hydraulic damping effect. The spring only follows the vibration caused by tension fluctuations of the chain and has little effect of damping vibration. There was thus a possibility that vibration might be amplified due to resonance and the like depending on the driving condition.

Another problem was that because the plunger structure was complex, the number of components was increased, and so was the production cost, and malfunctions could easily occur due to deformation or breakage.

With the technique described in Japanese Patent Application Laid-open No. 2000-145903, while plunger resonance can be reduced, vibration of other frequencies is not absorbed or dampened. It was thus difficult to always provide a suitable reaction force and damping force to various tension fluctuations.

Yet another problem was that, because a predetermined mass having the same resonance frequency as that of the plunger is added, the overall mass of the plunger is increased accordingly, which would lead to poorer response to the vibration caused by chain tension fluctuations.

An object of the present invention is to solve these problems and provide a chain tensioner that can always provide a suitable reaction force and damping force to various tension fluctuations of the chain, has a simple structure, is easy to produce, and also enables a reduction in the production cost.

The chain tensioner according to the present invention includes a tensioner body having a cylindrical plunger bore with an open end, a cylindrical plunger with a bottom, slidably inserted in the plunger bore, and biasing means that biases the plunger in a protruding direction of the plunger and is accommodated so as to freely expand and contract inside a high pressure chamber formed to extend over interiors of the plunger bore and the plunger. The biasing means are provided in plurality in series along the protruding direction of the plunger. A separator plate is provided between the plurality of biasing means. The separator plate partitions the high pressure chamber into a plurality of compartments, and has one or more oil passages that adjust flow of oil between the compartments of the high pressure chamber. The problems described above are solved by these features.

With the chain tensioner according to claim 1, a plurality of biasing means are provided in series along the protruding direction of the plunger, and a separator plate is provided between the plurality of the biasing means. The separator plate partitions the high pressure chamber into a plurality of compartments and includes one or more oil passages that adjust flow of oil between the compartments of the high pressure chamber. Therefore, damping characteristics imparted to the movement of the separator plate inside the plunger can be adjusted as desired by appropriately setting the flow rate of oil in the oil passage, and so, different damping characteristics can be imparted to the expanding and contracting movements of the plurality of biasing means.

The plurality of biasing means can each have a spring constant selected as desired, so that different spring characteristics can be imparted to the expanding and contracting movements of the plurality of biasing means.

Thus the spring constants and damping characteristics of the plurality of biasing means can be variously combined, so that the biasing means can always provide a suitable reaction force and damping force to various tension fluctuations of the chain.

The separator plate only needs to have one or more oil passages that adjust flow of oil between the compartments of the high pressure chamber and can be formed as a simple, lightweight component, so that it does not deteriorate the response of the plunger to the vibration caused by chain tension fluctuations. Since the plunger body has a simple shape structure as with the conventional one, and the separator plate also has a simple structure, they can be readily produced with low production cost, and do not cause an increase in breakage, deformation or the like.

According to the configuration set forth in claim 2, the oil passage is formed by one or more through holes provided to the separator plate. Since flow resistance can be provided as desired by suitably setting the size, shape, and number of the through holes, the damping characteristics imparted to the movement of the separator plate inside the plunger can be adjusted as desired. Therefore, different damping characteristics can be imparted to the expanding and contracting movements of biasing means.

According to the configuration set forth in claim 3, the oil passage is formed by one or more grooves or cut-outs provided on an outer circumferential edge of the separator plate. Since flow resistance can be provided as desired by suitably setting the size, shape, and number of the grooves or cut-outs, the damping characteristics imparted to the movement of the separator plate inside the plunger can be adjusted as desired. Therefore, different damping characteristics can be imparted to the expanding and contracting movements of the plurality of biasing means.

Grooves or cut-outs can be formed more easily by machining than the through holes. Moreover, grooves or cut-outs can be provided in addition to through holes, whereby the range of adjustment of flow resistance can be made even wider.

According to the configuration set forth in claim 4, the separator plate includes a protrusion that extends in the protruding direction of the plunger, and stops the coil spring from moving, so that the spring is seated more stably, and the protrusion restricts relative movements between the coil spring and the separator plate in directions other than the expanding or contracting directions. Therefore, the separator plate can move more smoothly inside the plunger, which prevents changes in flow resistance or resistance to the movement of the separator plate, and helps provide the damping characteristics in a stable manner.

According to the configuration set forth in claim 5, the protrusion includes an inner circumferential protrusion located inside the coil spring. Forming a longer through hole in this protrusion can provide larger flow resistance, whereby the range of adjustment of damping characteristics can be made wider.

According to the configuration set forth in claim 6, the protrusion includes an outer circumferential protrusion that is located outside the coil spring and forms an outer circumferential edge of the separator plate. The outer circumferential protrusion with its outer circumference edge formed long along the expanding/contracting direction enables smooth movement of the separator plate in a stable orientation inside the plunger, whereby damping characteristics can be provided in an even more stable manner.

According to the configuration set forth in claim 7, three or more biasing means are provided in series along the protruding direction of the plunger, and the separator plate is provided between each pair of biasing means. Thus, the spring constants and damping characteristics can be combined in an even wider variety, so that the biasing means can always provide a suitable reaction force and damping force to various tension fluctuations of the chain.

DESCRIPTION OF THE PREFERRED EMBODIMENTS

The chain tensioner of the present invention includes a tensioner body having a cylindrical plunger bore with an open end, a cylindrical plunger with a bottom, slidably inserted in the plunger bore, and biasing means that biases the plunger in a protruding direction of the plunger and is accommodated so as to freely expand and contract inside a high pressure chamber formed to extend over interiors of the plunger bore and the plunger. The biasing means are provided in plurality in series along the protruding direction of the plunger. A separator plate is provided between the plurality of biasing means. The separator plate partitions the high pressure chamber into a plurality of compartments, and has one or more oil passage that adjust flow of oil between the compartments of the high pressure chamber. The chain tensioner may be embodied in any specific form as long as it includes these features and as long as it can always produce a suitable reaction force and damping force to various chain tension fluctuations, has a simple structure, is easy to produce, and also enables a reduction of production cost.

For example, the separator plate may be made of any material as long as it does not break or deform by the pressure from the biasing means, such as resin, or metal such as iron or aluminum.

The plurality of biasing means may be in any form such as coil springs, plate springs and the like, and made of any material such as metal, rubber, resin, and the like. The plurality of biasing means may differ from each other in material or shape.

Embodiment 1

A chain tensioner 100 according to a first embodiment of the present invention will be described with reference to the drawings.

Figure 1:
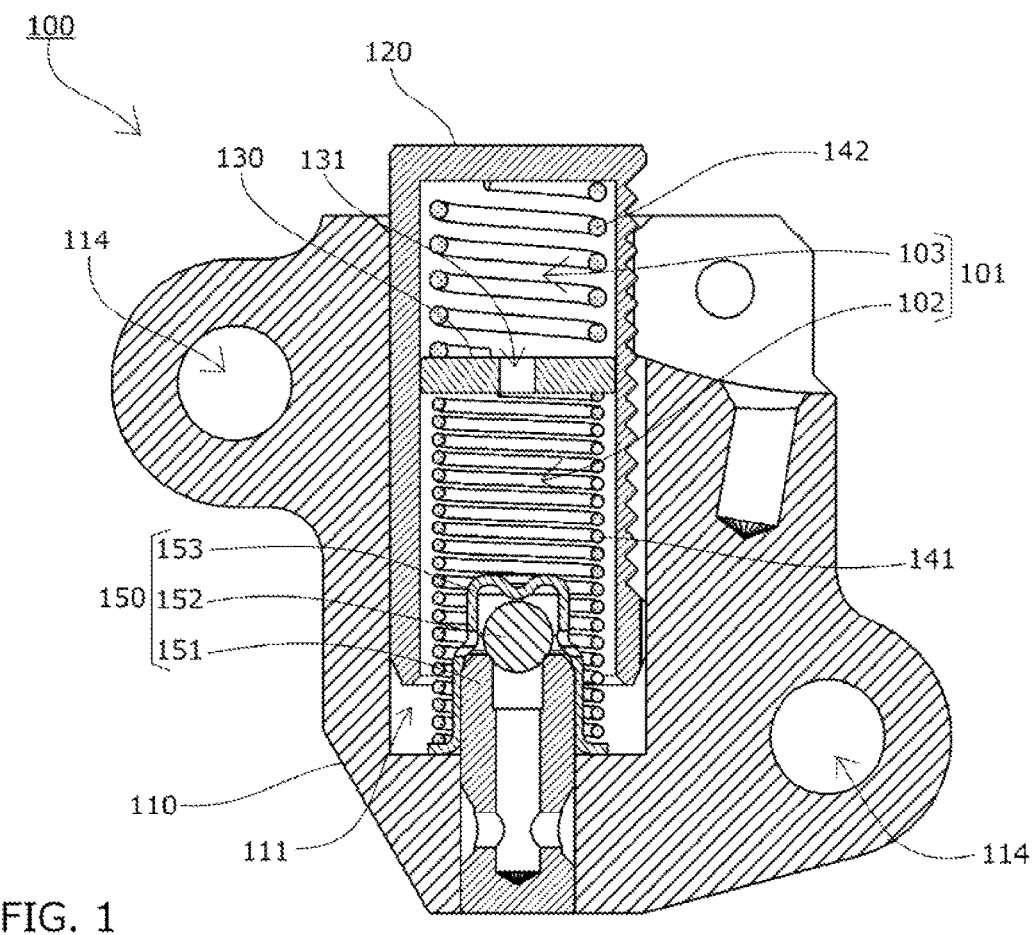
FIG. 1 is a cross-sectional view of a chain tensioner according to a first embodiment of the present invention.
Figure 2:
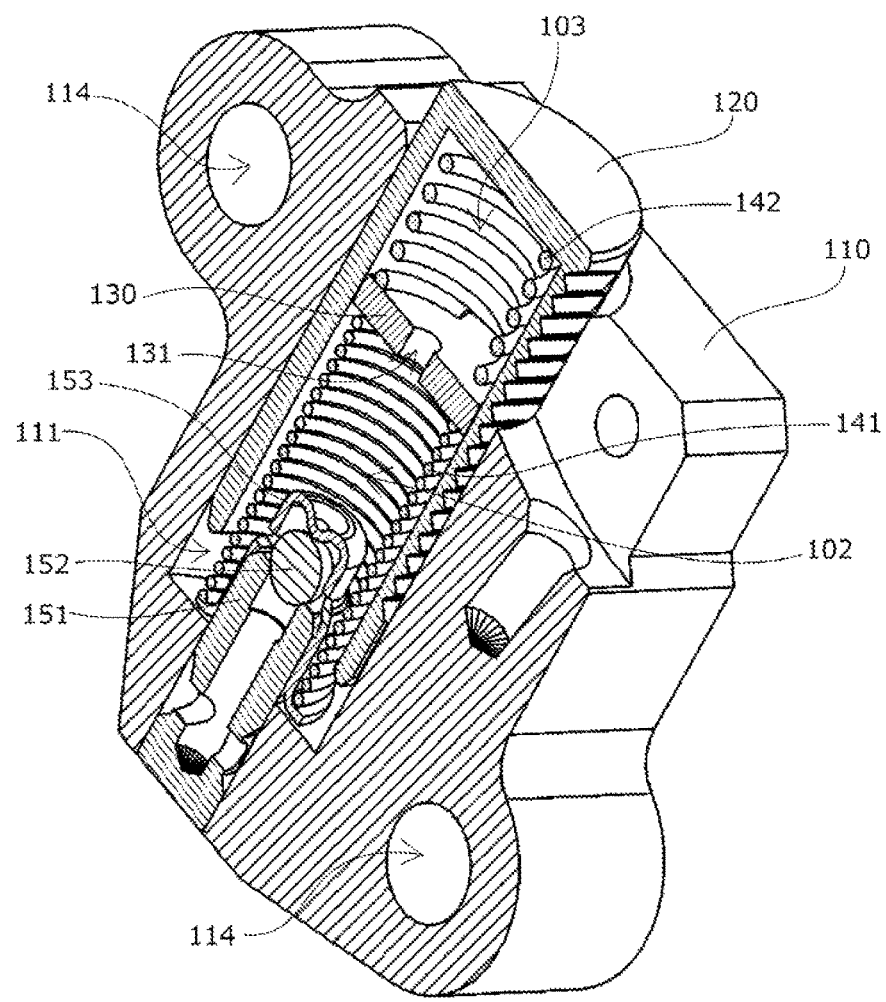
FIG. 2 is a perspective side view of the chain tensioner according to the first embodiment of the present invention.
Figure 3:
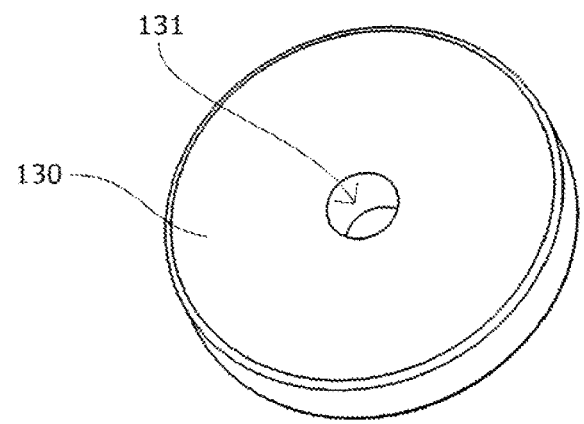
FIG. 3 is a perspective view of a separator plate of the chain tensioner according to the first embodiment of the present invention.

The chain tensioner 100 according to a first embodiment of the present invention includes, as shown in FIG. 1 to FIG. 3, a tensioner body 110 having a cylindrical plunger bore 111 with an open end, a cylindrical plunger 120 with a bottom, slidably inserted in the plunger bore 111, a first coil spring 141 and a second coil spring 142 that bias the plunger 120 in a protruding direction of the plunger 120, and a separator plate 130.

The first coil spring 141, separator plate 130, and second coil spring 142 are accommodated in series in a high pressure chamber 101 formed to extend over interiors of the plunger bore 111 and the plunger 120, the separator plate 130 partitioning the high pressure chamber 101 into a first high pressure chamber 102 and a second high pressure chamber 103.

The separator plate 130 has a through hole 131 that forms an oil passage, and is designed to provide damping characteristics when the plunger 120 reciprocates, with the flow resistance of the oil passing through the through hole 131 and moving to and from the first high pressure chamber 102 and the second high pressure chamber 103 as the separator plate 130 moves back and forth inside the plunger 120.

The chain tensioner 100 according to this embodiment is securely fixed inside an engine having a chain guide mechanism. For this purpose, the tensioner body 110 has mounting holes 114 for bolts or the like to pass through, as shown in FIG. 1 and FIG. 2.

A check valve 150 is disposed at the bottom of the plunger bore 111 in the tensioner body 110.

The check valve 150 includes a ball seat 151, a check ball 152 that can make tight contact with the oil passage in the ball seat 151, and a retainer 153 that guides the check ball 152. Oil is constantly supplied through the check valve 150 from the side on which the tensioner is mounted to the engine.

How the chain tensioner 100 according to the first embodiment of the present invention configured as described above operates will be explained.

During the engine operation, oil is constantly supplied from oil supply means provided in a mounting wall portion (not shown) through the check valve 150 so that the first high pressure chamber 102 and second high pressure chamber 103 are kept always filled with oil.

The chain tension fluctuates in various cycles and with various amplitudes depending on a variety of conditions such as changes in the engine rpm and loads during the engine operation.

When the plunger 120 moves in a pressing direction due to such changes in the chain tension, the oil inside the first high pressure chamber 102 leaks out through a small gap between the plunger bore 111 and the plunger 120, whereby a certain braking force is generated in accordance with the moving speed of the plunger 120 owing to the damping characteristics provided by flow resistance of the oil.

Also, a certain reaction force is produced by compression of the first coil spring 141 and second coil spring 142, by the amount determined by their respective spring constants.

Furthermore, a certain braking force is generated in accordance with the compression speed of the second coil spring 142 owing to the damping characteristics provided by flow resistance of the oil passing through the through hole 131 from the second high pressure chamber 103 into the first high pressure chamber 102 when the separator plate 130 moves by the amount of compression of the second coil spring 142.

On the other hand, when the plunger 120 moves in the protruding direction, oil is supplied into the first high pressure chamber 102 through the check valve 150. As there is no oil flow between the plunger bore 111 and the plunger 120, no braking force is produced there. However, as the separator plate 130 moves by the amount of expansion of the second coil spring 142, a certain braking force is generated in accordance with the expansion speed of the second coil spring 142 owing to the damping characteristics provided by flow resistance of the oil passing through the through hole 131 from the first high pressure chamber 102 into the second high pressure chamber 103.

Also, as the first coil spring 141 and second coil spring 142 expand, the reaction force is reduced by the amount of expansion that is determined by their respective spring constants.

This way, by providing the separator plate 130, the damping characteristics associated with compression and expansion are made different between the first coil spring 141 and the second coil spring 142. Therefore, by selecting and combining the spring constants of respective coil springs and the damping characteristics of the separator plate 130 as appropriate, the tensioner can be designed to operate suitably to various tension fluctuations of the chain and elongation of the chain due to heat or aging.

For example, the second coil spring 142 may have a spring constant smaller than that of the first coil spring 141. For tension fluctuations in short cycles and with small amplitudes caused by vibration or the like during normal operation of the engine, the relative moving speed of the separator plate 130 is lower and it provides little damping effect. Therefore, such fluctuations can be absorbed by the second coil spring 142 having a smaller spring constant with good response. For tension fluctuations with large amplitudes caused by a sudden change in the load or engine rpm, the first coil spring 141 having a larger spring constant can act to a greater extent.

Even when the plunger 120 advances in the protruding direction along with a long-term elongation of the chain due to heat or aging, there will be less change in the biasing force (reaction forces of the first coil spring 141 and second coil spring 142) in accordance with the position of the plunger 120, because the second coil spring 142 has a small spring constant.

The damping characteristics provided by the separator plate 130 are adjustable through setting of the size of the through hole 131 as appropriate.

The damping characteristics can be set variously by changing the shape and number of the through hole 131 thereby to adjust the flow rate of the oil.

Figure 4:
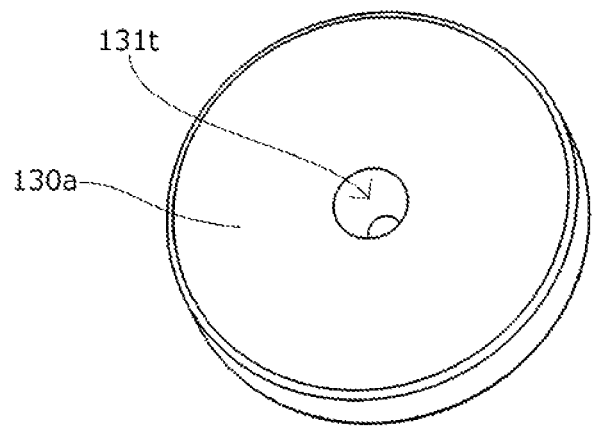
FIG. 4 is a perspective view of a first variation example of the separator plate.

For example, as shown in FIG. 4, the through hole 131t in the separator plate 130a may be tapered so that the flow resistance of the oil will be different depending on the moving direction of the separator plate 130a (moving direction of the plunger 120), whereby the damping characteristics may be differed between when the springs are compressed and when they are expanded.

Figure 5:
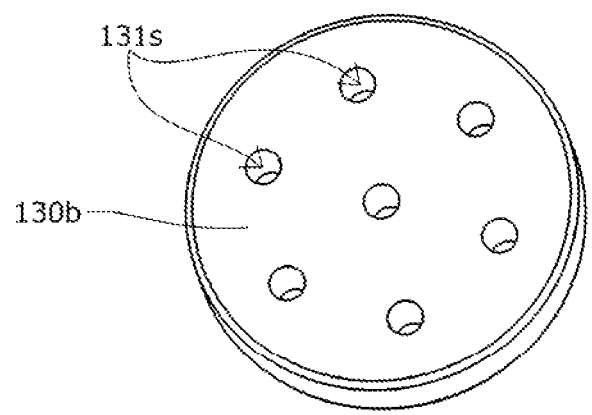
FIG. 5 is a perspective view of a second variation example of the separator plate.
Figure 6:
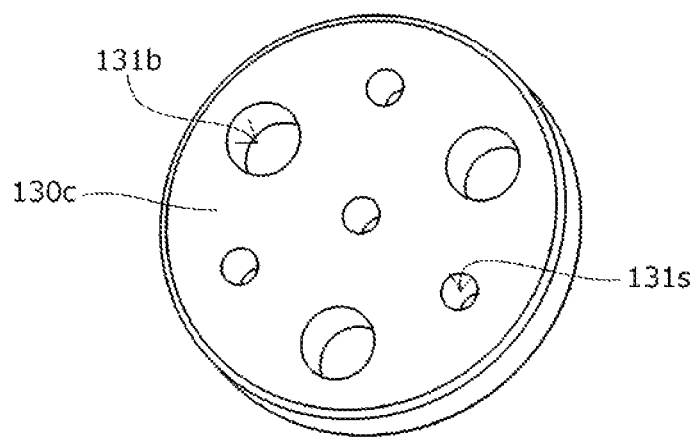
FIG. 6 is a perspective view of a third variation example of the separator plate.
Figure 7:
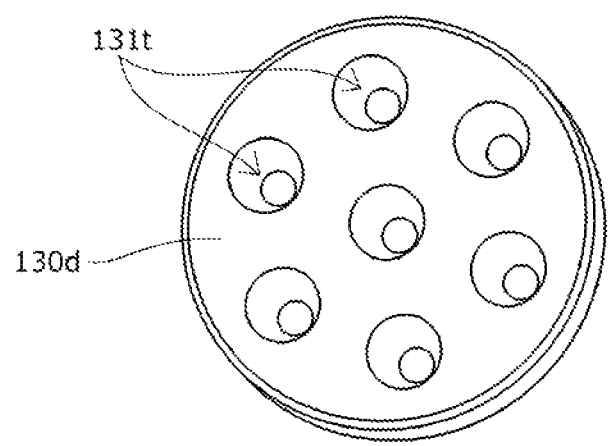
FIG. 7 is a perspective view of a fourth variation example of the separator plate.

Alternatively, a plurality of small through holes 131s may be provided as in the separator plate 130b shown in FIG. 5, or a combination of through holes 131s and 131b of different sizes may be provided as in the separator plate 130c shown in FIG. 6, or a plurality of tapered through holes 131t may be provided as in the separator plate 130d shown in FIG. 7. This way, selection of the type, arrangement, and number of the through holes 131s, 131b, and 131t allows a wide variety of damping characteristics to be set, and different appearances of separator plates having different damping characteristics will facilitate visual recognition when selecting one during design and production.

To set flow resistance and damping characteristics of the separator plate 130, an oil passage may be formed to allow flow of oil between an outer circumferential portion of the separator plate 130 and an inner circumferential surface of the plunger 120, instead of or in addition to the through hole 131.

Figure 8:
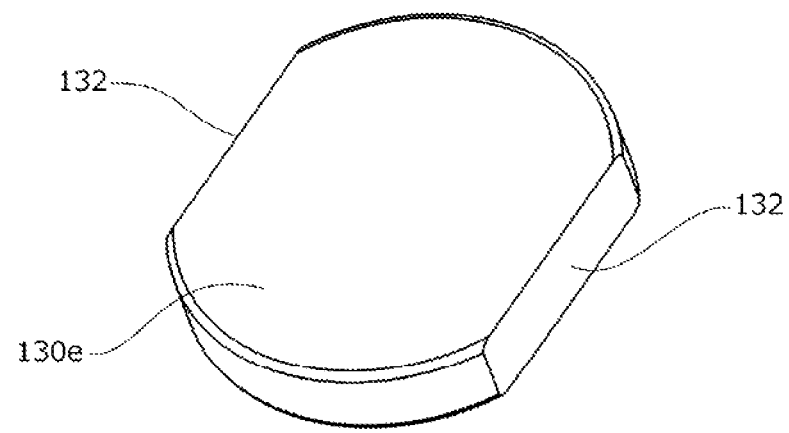
FIG. 8 is a perspective view of a fifth variation example of the separator plate.
Figure 9:
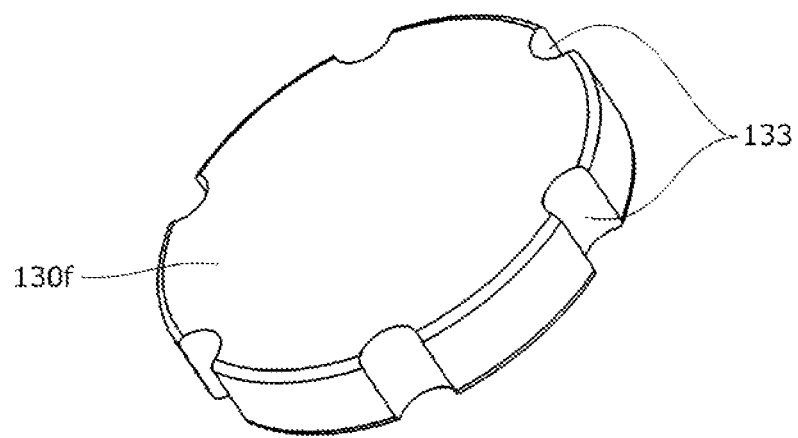
FIG. 9 is a perspective view of a sixth variation example of the separator plate.

For example, the separator plate 130e shown in FIG. 8 has two cut-outs 132, while the separator plate 130f shown in FIG. 9 has six grooves 133.

The type, shape, arrangement, number, and combination of through holes, cut-outs, and grooves of the separator plates shown in FIG. 3 to FIG. 8 are illustrated only as examples, and any type or shape may be employed in any arrangement, number, and combination, as long as they provide desired flow resistance and damping characteristics.

Since the separator plate 130 forms a seat for the coil springs on both sides, it may have protrusions that restrict relative movement between the separator plate and the coil springs so that the coil springs will stay on the seats more stably.

Figure 10:
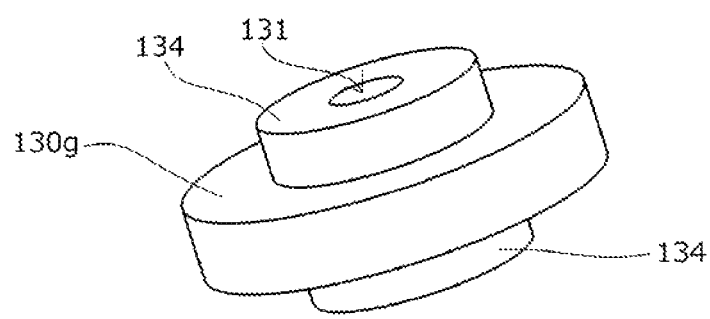
FIG. 10 is a perspective view of a seventh variation example of the separator plate.

For example, the separator plate 130g shown in FIG. 10 has an inner circumferential protrusion 134 at the center, and a through hole 131 is provided in this inner circumferential protrusion 134.

As the inner circumferential protrusion 134 fits with the inner circumference of the coil spring, it restricts movement of the spring relative thereto.

Also, because the through hole 131 is formed in the inner circumferential protrusion 134, the oil passage is long so that flow resistance is larger and the damping characteristics can be improved.

The diameters and protruding amounts of inner circumferential protrusions 134 on both sides may be different from one another to match the respective coil springs.

The length of the inner circumferential protrusion 134 may be made equal to or greater than the length of the coil spring when it is compressed most, so that the inner circumferential protrusion 134 makes contact with the plunger or tensioner body when the coil spring is largely compressed.

This prevents the wires of the coil springs from contacting each other, whereby wear on the spring wires can be prevented.

Figure 11:
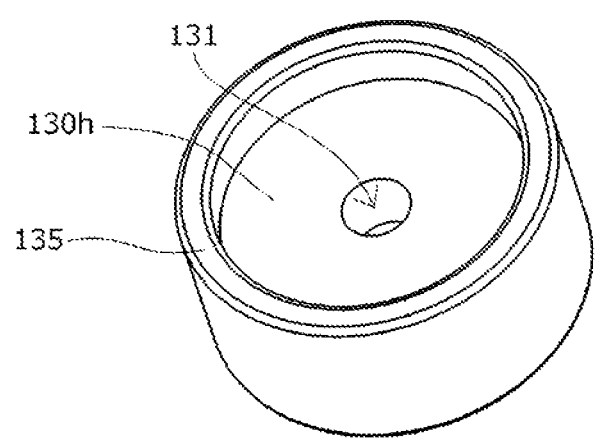
FIG. 11 is a perspective view of an eighth variation example of the separator plate.

The separator plate 130h shown in FIG. 11 has an outer circumferential protrusion 135 that forms the outer circumferential edge.

The outer circumferential protrusion 135 fits with the outer circumference of the coil spring and restricts movement of the spring relative thereto. The separator plate 130h can smoothly move in a stable orientation inside the plunger so that it can provide damping characteristics in a stable manner.

The diameters and protruding amounts of outer circumferential protrusions 135 on both sides may be different from each other to match respective coil springs. The protrusion may not necessarily extend all around as shown but a plurality of protrusions may be intermittently provided along the outer periphery.

Embodiment 2

Figure 12:
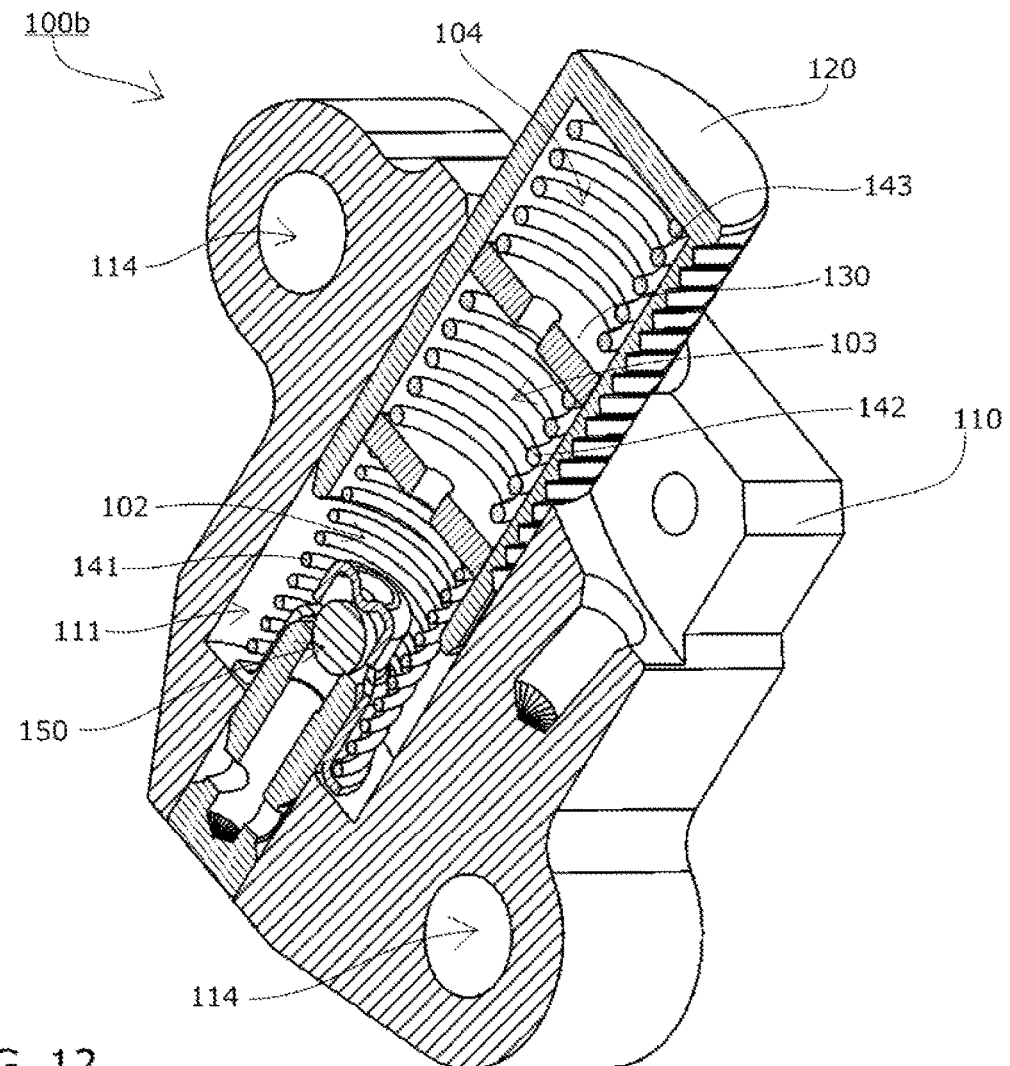
FIG. 12 is a perspective side view of a chain tensioner according to a second embodiment of the present invention.
Figure 13:
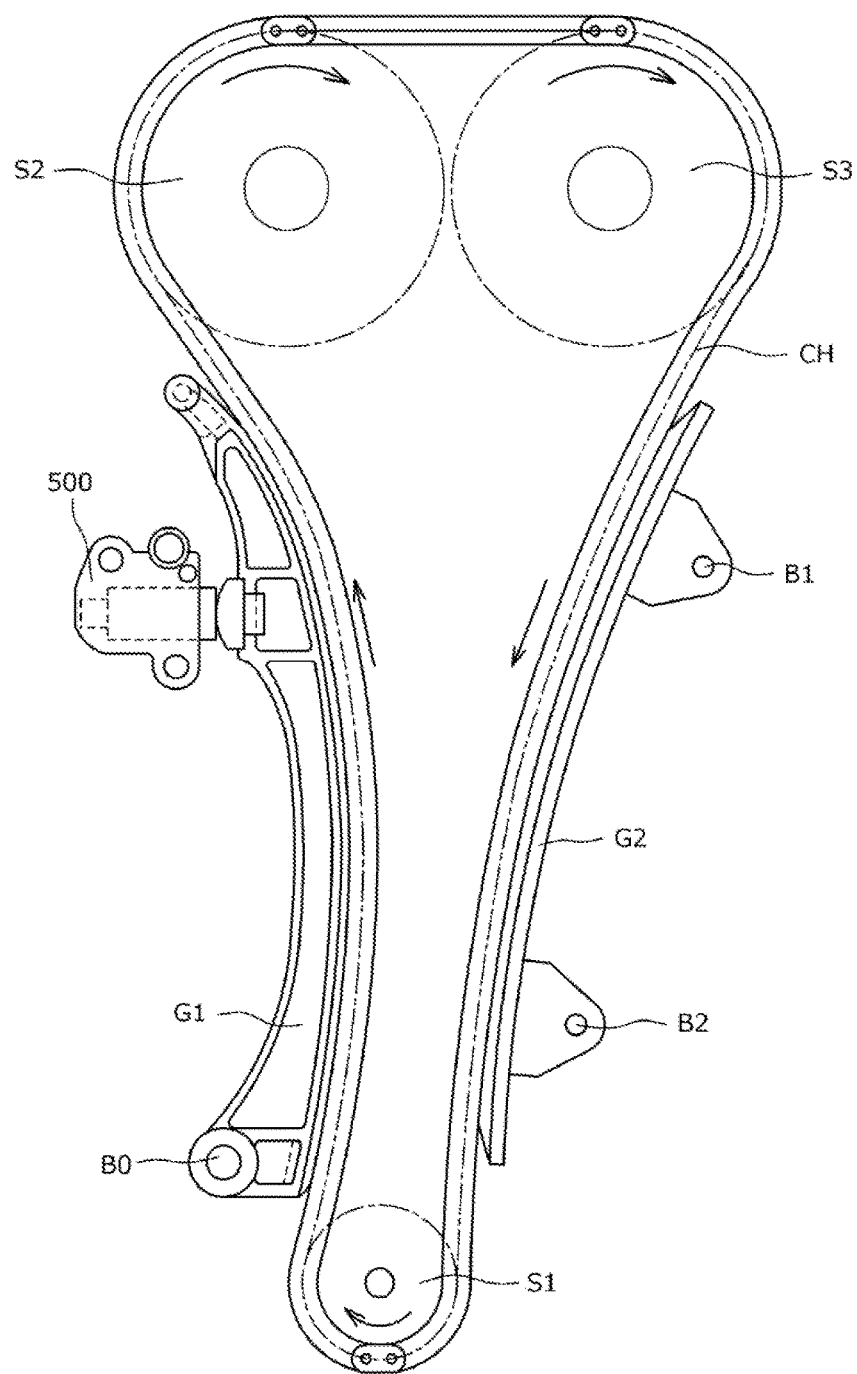
FIG. 13 is an explanatory diagram of the chain tensioner used in the chain guide mechanism of an engine.
Figure 14:
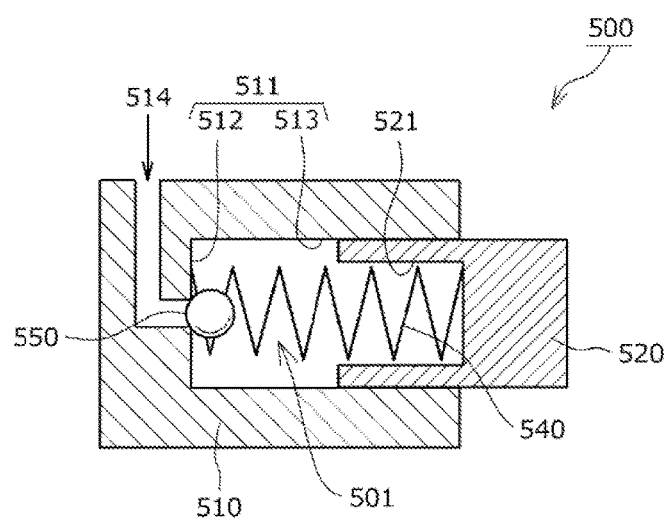
FIG. 14 is a schematic explanatory diagram of a conventional chain tensioner.

The chain tensioner 100b according to a second embodiment of the present invention includes an additional separator plate 130 as well as a third coil spring 143 as compared to the chain tensioner 100 according to the previously described first embodiment, as shown in FIG. 12.

The first coil spring 141, separator plate 130, second coil spring 142, separator plate 130, and third coil spring are accommodated in series in a high pressure chamber 101 formed to extend over interiors of the plunger bore 111 and the plunger 120. The two separator plates 130 partition the high pressure chamber 101 into three compartments, i.e., a first high pressure chamber 102, a second high pressure chamber 103, and a third high pressure chamber 104.

The chain tensioner is configured the same in other respects as the chain tensioner 100 according to the first embodiment (same components and structures are given the same reference numerals as those of the first embodiment).

In this embodiment, two separator plates 130 and three coil springs 141, 142, and 143 are provided. The damping characteristics associated with compression and expansion are different between the first coil spring 141, second coil spring 142, and third coil spring 143. Therefore, by selecting and combining the spring constants of respective coil springs and the damping characteristics of the respective separator plates 130 as appropriate, the tensioner can be designed to operate even more suitably to various tension fluctuations of the chain and elongation of the chain due to heat or aging.

While specific examples of the chain tensioner according to the present invention have been described in the embodiments above, the chain tensioner according to the present invention is not limited to these examples, and the shapes, positions, sizes, and positional relationships with each other of various constituent parts may be changed in various manners.

Other components commonly included in a chain tensioner, such as a ratchet mechanism, may of course be added to the configurations of the embodiments described above.

The chain tensioner of the present invention may not necessarily be applied to a chain guide mechanism that uses a guide shoe for slidably guiding a transmission chain such as an endless roller chain passing over respective sprockets of a crankshaft and a cam shaft in an engine room, but may also be adopted in applications where the chain is slidably guided directly by the distal end of the plunger.

The chain tensioner may not necessarily be applied to a chain transmission mechanism but also to similar transmission mechanisms that use belts, ropes and the like, and can be applied in a variety of industrial fields where it is necessary to deliver enough oil at restart after a long time after the oil supply was stopped.

What is claimed is:

1. A chain tensioner comprising:
   a tensioner body having a cylindrical plunger bore with an open end;
   a cylindrical plunger with a bottom, slidably inserted in the plunger bore; and
   biasing means that biases the plunger in a protruding direction of the plunger and is accommodated so as to freely expand and contract inside a high pressure chamber formed to extend over interiors of the plunger bore and the plunger,
   the biasing means being provided in plurality in series along the protruding direction of the plunger,
   a separator plate being provided between the plurality of biasing means, and
   the separator plate partitioning the high pressure chamber into a plurality of compartments and including one or more oil passages that adjust flow of oil between the compartments of the high pressure chamber,
   wherein the outer periphery of the plunger slides on the inner wall of the cylindrical plunger bore, and
   wherein the separator plate is independently formed in a plate-like shape.

2. The chain tensioner according to claim 1, wherein the oil passage is formed by one or more through holes provided to the separator plate.

3. The chain tensioner according to claim 1, wherein the oil passage is formed by one or more grooves or cut-outs provided on an outer circumferential edge of the separator plate.

4. The chain tensioner according to claim 1, wherein at least one of the plurality of biasing means is formed by a coil spring, and
   the separator plate includes a protrusion that extends in the protruding direction of the plunger, and stops the coil spring from moving.

5. The chain tensioner according to claim 4, wherein the protrusion includes an inner circumferential protrusion located inside the coil spring.

6. The chain tensioner according to claim 4, wherein the protrusion includes an outer circumferential protrusion that is located outside the coil spring and forms an outer circumferential edge of the separator plate.

7. The chain tensioner according to claim 1, wherein three or more of the biasing means are provided in series along the protruding direction of the plunger, and
   the separator plate is provided between each pair of biasing means.

* * * * *